US009185091B2

(12) United States Patent
Leibovitz et al.

(10) Patent No.: US 9,185,091 B2
(45) Date of Patent: Nov. 10, 2015

(54) EXTENSIBLE ACCESS CONTROL ARCHITECTURE

(71) Applicants: Anthony M. Leibovitz, Issaquah, WA (US); Mark C. Schurman, Seattle, WA (US); Mudit Goel, Redmond, WA (US); Paul G. Mayfield, Sammamish, WA (US); Sudhakar Pasupuleti, Issaquah, WA (US); Taroon Mandhana, Redmond, WA (US); Vivek P. Kamath, Redmond, WA (US); Wei Zheng, Bellevue, WA (US); Xuemei Bao, Issaquah, WA (US)

(72) Inventors: Anthony M. Leibovitz, Issaquah, WA (US); Mark C. Schurman, Seattle, WA (US); Mudit Goel, Redmond, WA (US); Paul G. Mayfield, Sammamish, WA (US); Sudhakar Pasupuleti, Issaquah, WA (US); Taroon Mandhana, Redmond, WA (US); Vivek P. Kamath, Redmond, WA (US); Wei Zheng, Bellevue, WA (US); Xuemei Bao, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/630,184

(22) Filed: Sep. 28, 2012

(65) Prior Publication Data

US 2013/0024911 A1    Jan. 24, 2013

Related U.S. Application Data

(63) Continuation of application No. 11/177,757, filed on Jul. 8, 2005, now Pat. No. 8,286,223.

(51) Int. Cl.
*H04L 29/06* (2006.01)

(52) U.S. Cl.
CPC .............. *H04L 63/08* (2013.01); *H04L 63/162* (2013.01)

(58) Field of Classification Search
CPC ........................... H04L 63/08; H04L 63/0876
USPC ...................... 726/3, 14, 24, 28, 182; 713/182
See application file for complete search history.

(56) References Cited

U.S. PATENT DOCUMENTS

| 7,320,141 B2 | 1/2008 | Hemsath |
| 7,483,984 B1 | 1/2009 | Jonker |

(Continued)

OTHER PUBLICATIONS

S. Kondo et al. "Quarantine Model Overview for IPv6 Network Security draft-kondo-quarantine-overview-01" Published Jul. 18, 2004 (28 pages) http://www.consulintel.euro6ix.com/ietf/draft-kondo-quarantine-overview-01.txt.*

(Continued)

*Primary Examiner* — Joseph P Hirl
*Assistant Examiner* — Thomas Gyorfi
(74) *Attorney, Agent, or Firm* — Judy Yee; Timothy Churna; Micky Minhas

(57) ABSTRACT

Software for managing access control functions in a network. The software includes a host that receives access control commands or information and calls one or more methods. The methods perform access control functions and communicate access control results or messages to be transmitted. The host may be installed in a network peer seeking access to the network or in a server controlling access to the network. When installed in a peer, the host receives commands and exchanges information with a supplicant. When installed in an access control server, the host receives commands and exchanges information with an authenticator. The host has a flexible architecture that enables multiple features, such as allowing the same methods to be used for authentication by multiple supplicants, providing ready integration of third party access control software, simplifying network maintenance by facilitating upgrades of authenticator software and enabling access control functions other than peer authentication.

20 Claims, 4 Drawing Sheets

(56) References Cited

U.S. PATENT DOCUMENTS

| | | | |
|---|---|---|---|
| 7,506,370 B2 | 3/2009 | Aggarwal | |
| 7,533,407 B2 * | 5/2009 | Lewis et al. | 726/6 |
| 7,587,485 B1 * | 9/2009 | Chitnis et al. | 709/224 |
| 7,657,744 B2 | 2/2010 | Kok | |
| 7,890,992 B2 * | 2/2011 | Schwartzman et al. | 726/4 |
| 8,068,414 B2 * | 11/2011 | Huegen et al. | 370/230 |
| 2003/0056096 A1 | 3/2003 | Albert | |
| 2004/0010713 A1 | 1/2004 | Vollbrecht | |
| 2004/0078597 A1 | 4/2004 | Sun | |
| 2004/0107360 A1 | 6/2004 | Herrmann | |
| 2004/0111520 A1 | 6/2004 | Krantz | |
| 2004/0225878 A1 | 11/2004 | Costa-Requena | |
| 2004/0268336 A1 | 12/2004 | Lu | |
| 2005/0021956 A1 | 1/2005 | Genty | |
| 2005/0021957 A1 | 1/2005 | Gu | |
| 2005/0071677 A1 | 3/2005 | Khanna | |
| 2005/0090232 A1 | 4/2005 | Hsu | |
| 2005/0131997 A1 * | 6/2005 | Lewis et al. | 709/203 |
| 2005/0198495 A1 * | 9/2005 | De Jaegher et al. | 713/155 |
| 2005/0267954 A1 * | 12/2005 | Lewis et al. | 709/221 |
| 2005/0273853 A1 * | 12/2005 | Oba et al. | 726/22 |
| 2006/0026670 A1 * | 2/2006 | Potter et al. | 726/7 |
| 2006/0041939 A1 * | 2/2006 | Schwartzman et al. | 726/15 |

OTHER PUBLICATIONS

"Implementing Network Admission Control Phase One Configuration and Deployment" © 2004 Cisco Systems. Witnessed Aug. 9, 2004 by the Internet Archive; document creation date of Jun. 17, 2004. (88 pages) http://web.archive.org/web/20040809000958/cisco.com/application/pdf/en/us/guest/netsol/ns466/c654/cdccont_0900aecd800fdd7b.pdf.*
"Cisco Security Vision and Network Admission Control" © 2004 Cisco Systems Inc. Published Jun. 2004 (16 pages) http://web.archive.org/web/20050531124722/www.cisco.com/application/pdf/en/us/guest/netsol/ns466/c664/cdccont_0900aecd800ce939.pdf.*
"Network Admission Control At-a-Glance" © 2004 Cisco Systems Inc. Published Jun. 23, 2004 as verified by the Internet Archive http://web.archive.org/web/20040623205457/www.cisco.com/application/pdf/en/us/guest/netsol/ns466/c643/cdccont_0900aecd800fdd58.pdf.*
Cisco Systems: Network Admission Control web page © 2004 Cisco Inc. Published Nov. 4, 2004 as verified by the Internet Archive http://web.archive.org/web/20041104033800/www.cisco.com/en/US/netsol/ns466/networking_solutions_sub_solution_home.html.*
B. Aboba & P. Calhoun. "RFC 3579: RADIUS (Remote Authentication Dial In User Service) Support for Extensible Authentication Protocol (EAP)" © 2003 The Internet Society (46 pages) http://tools.ietf.org/pdf/rfc3579.pdf.*
B. Aboba et al. "RFC 3748: Extensible Authentication Protocol (EAP)" © 2004 The Internet Society (67 pages) http://tools.ietf.org/pdf/rfc3748.pdf.*
"Security Enhancements for Remote Access at Microsoft", Executive Summary, Mar. 1, 2004, downloaded Jun. 16, 2005, pp. 1-41.
"Authentication Modules Based on IEEE802.1x", downloaded Jun. 16, 2005, pp. 1-3.
"Network Selection Implementation Results", downloaded on Jun. 16, 2005, pp. 1-27.
Telco Systems, "Telco Systems' WiFi Solution Application Note Version 1.0", downloaded Jun. 16, 2005, pp. 1-4.
SecureSuite™ XS Server v4.5, downloaded Jun. 16, 2005, pp. 1-4.
T. Dierks, "RFC2246: The TLS Protocol Version 1.0" Published Jan. 1999 (80 pages).
"Microsoft TechNet: How 802.11 Wireless Works". Updated Mar. 28, 2003 (14 pages).
Comer, Douglas. "Internetworking with TCP/IP, vol. 1" © 1995 Prentice Hall Inc. Excerpts from Chapter 11 (pp. 159-177).
Wikipedia article for "Interface (computer science)" as originally published on Aug. 29, 2004 (3 pages).
B. Ababa, "RFC 2716: PPP EAP TLS Authentication Protocol" © 1999 The Internet Society (24 pages).
Kackie Charles, "Windows 2000 Routing and Remote Access Service" © 2000 Sams Inc. Excerpt from chapter 2 (22 pages).
B. Aboba, "RFC 3748: Extensible Authentication Protocol (EAP)" © 2004 The Internet Society (67 pages).

* cited by examiner

EXTENSIBLE ACCESS CONTROL ARCHITECTURE

RELATED APPLICATION(S)

This Application is a continuation of and claims priority from U.S. patent application Ser. No. 11/177,757 that was filed on Jul. 8, 2005 and that is incorporated herein by reference in it entirety.

BACKGROUND OF INVENTION

Computer networks are widely used in many businesses and even in many home settings. In a typical network architecture, many "peers" connect to the network. The network serves as a conduit of information to and from the peers, allowing the peers to exchange information with servers or other network resources or with other peers also connected to the network. For example, a traditional peer may be a desktop computer running the Windows® operating system to create a platform for application programs.

The peer includes a network interface card or other device allowing for a connection to the physical transport medium making up the network. Software added to the operating system, sometimes referred to as a "supplicant," controls the transmission and receipt of datagrams over the physical network medium. The supplicant transmits and interprets datagrams received over the physical media according to a protocol recognized by other network elements, so that network communication is possible. The supplicant implements a transport mechanism and passes information representing a message within the datagram to application programs executing on the peer.

Unfortunately, the widespread use of computer networks has also led to widespread abuse of computer networks. Consequently, most networks include authentication features that block unauthorized access to the network by peers even if sending datagrams according to the network protocol. Traditionally, network authentication is managed by servers connected to access points, switches, RAS/VPN servers or other Network Access Servers (NAS) through which peers may connect to the network. As a peer attempts to connect to the network, these servers, sometimes referred to as RADIUS servers or IAS servers, authenticate the peer to determine whether network access should be granted. If the peer cannot be authenticated, datagrams sent by the peer are not passed through the server to the rest of the network. Likewise, information from the network is not passed on to the peer.

Different networks may be configured to incorporate different mechanisms to authenticate peers. Generally, authentication involves an exchange of datagrams between an authenticator program on the server and the supplicant on the client. The exchange may result in identifying information about the peer being provided to the authenticator software. Additionally, security information or user information may be provided by the supplicant to the authenticator program on the server. For example, the supplicant may prompt a user to enter a user name or password, which is then passed on to the authenticator software by the supplicant. The authentication can be bidirectional. For example, the server can be authenticated by the client as well as the client being authenticated by the server. This is important because it is possible for attackers to set up "fake" access points to which a client may connect. The fake access point allows a client to connect and then can take unauthorized actions. For example, the fake access point can steal the client identity/credentials, become a man-in-the-middle, etc. Certain EAP methods provide the ability for both sides, peer and authenticator, to authenticate each other and thereby avoid such malicious activity. Other types of security information are used in known networks. For example, codes read from smartcards, information from biometric sensors or certificates may all be provided by a supplicant to authenticator software on a server, depending on the specific authentication mechanism in use in the network.

Though many identification mechanisms are available, attempts have been made to standardize the peer authentication process. The Extensible Authentication Protocol (EAP) defined at RFC 3748 is one such effort to standardize the authentication process. Though standardized, the EAP is intended to be extensible—meaning that the EAP provides a framework for the authentication process. Within that framework, the content of the authentication information exchanged between supplicant and authenticator software may be defined by the network architect, allowing many authentication mechanisms to be employed.

SUMMARY OF INVENTION

The EAP host is provided to facilitate access control within a network. The EAP host may be installed within a server and/or within a peer in the network. The EAP host provides one or more interfaces that facilitate integration of access control functionality into the network, whether at initial network installation or as the network is upgraded or modified. By incorporating access control functionality within the EAP host, the complexity of supplicants may be reduced.

The EAP host may include an interface for supplicants in a peer and/or access control software in a server. Access to software that manages an authentication protocol, software that manages a protocol that verifies the "health" or compatibility of a peer before allowing the peer access to the network or software that performs other access control functions may be obtained through the host. The EAP host may provide a standard interface to any software providing access control functions, allowing that software to be readily incorporated or modified within the network. In addition to providing an interface for access to existing services, the EAP host provides an interface to which new EAP methods may be written. The new EAP methods plug in to the EAP host and are automatically available to all supplicants and authenticators in the system.

The foregoing summary is not a limiting description of the invention, which is defined solely by the appended claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

We have recognized that implementation of network access control can be facilitated with software that provides standardized interfaces to components that implement network access control functions. An example of such software is the EAP host described below. By providing standardized interfaces to network access control functions, supplicants developed for a particular platform need not implement the network access control functions, thereby simplifying development and maintenance of supplicants. In addition, new EAP methods can be written and plugged into the EAP host. These new methods are then available to all system supplicants and authenticators.

We have also recognized that in some instances software to control network access functions accounts for over half of the code in each supplicant. Reducing the size of supplicant code may be particularly important, for example, in resource limited peers such as pocket PC's, PDA's, Smart Phones or Set Top Boxes. By separating network access control functions from the supplicant code, code that implements network access control functions may be shared among multiple supplicants, thereby reducing the size of the supplicant code and significantly decreasing the security risk since a single copy of the security-sensitive code is used.

In some embodiments, each network access control function is encoded by a software component such as a method, procedure or function. Such network access control components include standard interfaces, allowing any supplicant to interact with any network access control component. Moreover, by separating the code implementing network access control functions into separate components accessible through a standardized interface, the code controlling the network access control function may be modified or updated without requiring changes to the supplicant or other aspects of the access control system. Further, software implementing network access control functions may be readily integrated in the access control system, allowing access control software provided by third party suppliers to be used.

Figure 1:
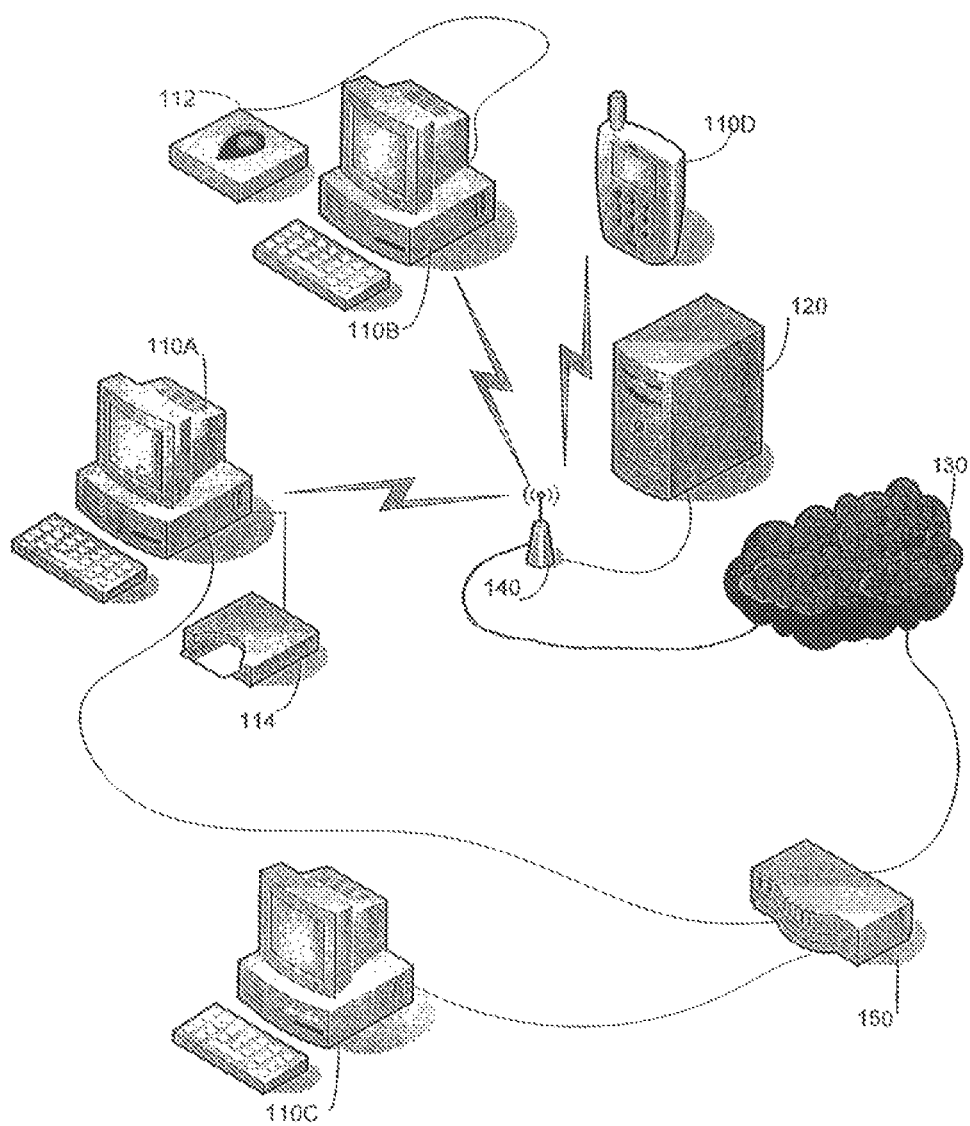
FIG. 1 is a sketch of a network according to one embodiment of the invention.

Turning now to FIG. 1 an example of a network according to one embodiment of the invention is shown. The network includes multiple peers such as peers 110A, 110B, 110C and 110D. Peers 110A, 110B and 110C are desktop computers. Peer 110D represents a portable electronic device such as a Smart Phone, which may also be a peer connected to a network. In this example, each peer is a computing device used by an individual, but any type of peer, whether now known or hereafter developed, may be incorporated in the network.

Each of the peers may be a computing device with one or more processors equipped with an operating system to create a platform for application programs. The hardware portion of each peer may include one or more processors such as are now known or hereafter developed for use in computing devices. The software portion of each peer may include an operating system as is known in the art. However, in some embodiments, the operating system is modified to incorporate access control software as described more fully below.

Additionally, some of the peers are shown to include hardware elements used for access control. An advantage of the software architecture described herein is that it may readily accommodate many forms of access control information. In the example of FIG. 1, peer 110A is equipped with a Smart Card reader 114. Peer 110A may read access control information from a Smart Card inserted into Smart Card reader 114 as a way to validate the identity of a user of the peer 110A. Peer 110B is shown with an alternative hardware device to generate access control information. In the example, peer 110B includes a biometric sensor 112, such as a thumb print scanner. Peer 110B may read data from biometric sensor 112 also to obtain identifying information about a human user of peer 110B. However, such hardware devices are not the exclusive means by which access control information may be obtained. Any of the peers may read configuration information from other hardware connected to the peer, read data, such as a certificate file stored in the memory associated with the peer, or may receive security information, such as a password or a user name, from a user through a user interface such as a keyboard.

Each of the peers 110A, 110B, 110C and 110D also includes hardware that may communicate over a physical medium to allow its respective peer to be connected to the network. In the example of FIG. 1, peers 110B and 110D include wireless network interface cards allowing those peers to communicate over an RF link to wireless access point 140. Peer 110C includes an Ethernet network card, allowing that peer to communicate over a cable to switch 150, that serves as an access point into a network. Peer 110A is shown configured with hardware to allow access to the network over one of multiple media. As illustrated peer 110A can exchange datagrams over an RF link with wireless access point 140 and datagrams over a cable with switch 150.

Wireless access point 140 is shown connected to a server 120 that controls access to the resources of the network, represented generally in FIG. 1 as network cloud 130. Network cloud 130 is a schematic representation of all the network devices, whether now known or hereafter developed, that may be accessible to peers 110A, 110B, 110C and 110D over the network.

Server 120 may serve the role of RADIUS or IAS server as known in the art. Similarly, switch 150 may contain a processor programmed to perform the same access control functions as server 120. Therefore, switch 150 may control access to network cloud 130 from peer 110C or peer 110A communicating over a wired network.

Communications between network elements may be in any suitable protocol. For example, communication between peers such as 110A, 110B and 110D and wireless access point 140 may be in a standard 802.1X or PPP or some other protocol. Communications between wireless access point and server 120 may be in a RADIUS protocol. Similarly, communications between peers 110A and 110C and switch 150 may be in a known protocol, such as TCP/IP. The 802.1X protocol is used to facilitate authentication with switch 150. Assuming successful authentication, switch 150 will then forward datagrams to the network.

When a client/peer/supplicant wants to access the network, they connect to the access point 140. The access point 140 establishes a connection to the RADIUS server 120. The RADIUS server 120 and the peer/client/supplicant then exchange a series of EAP messages, with the access point 140 acting as an intermediary. The exact contents of the EAP messages depend upon the EAP method that is being used. When this exchange of messages ends, the RADIUS server 120 sends the access point 140 a message informing it whether or not the peer/client/supplicant should have access to the network. If access is granted, then the access point 140 allows the peer/client/supplicant to have unrestricted access to the network. Prior to this time the peer/client/supplicant can only send EAP messages through the access point 140, and those messages are always sent to or from the RADIUS server 120 for processing.

The network illustrated in FIG. 1 is a simplified example of a network in which the invention may be employed. A typical network may include many more peers than illustrated. Likewise, a network may include many more access points than illustrated in FIG. 1. For example, a network deployed within an enterprise may have numerous access points that are geographically distributed over a very wide area. Further, more or different types of media may be used to transmit datagrams between a peer and an access point. For example, datagrams may be transmitted over wires, wirelessly, over optical fiber or any other suitable media.

Figure 2:
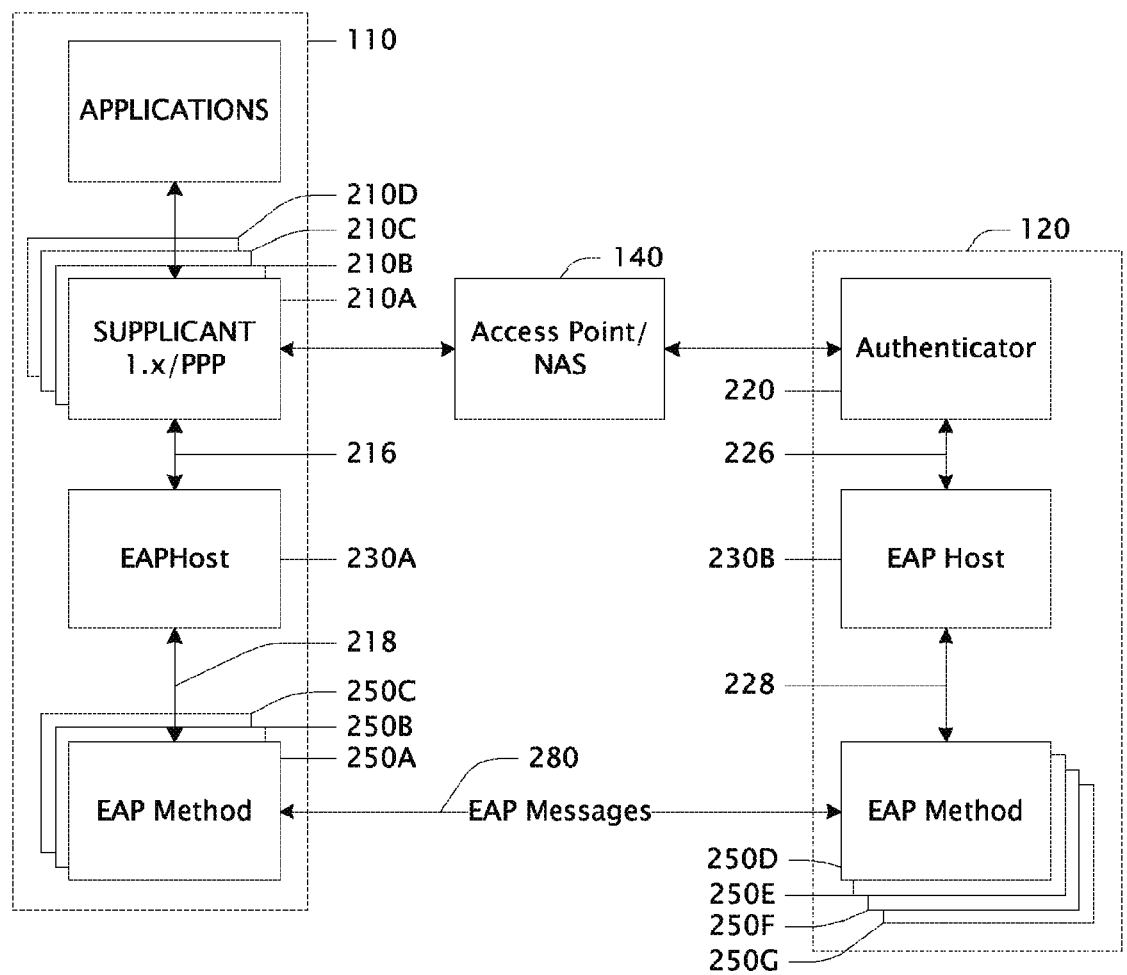
FIG. 2 is a block diagram illustrating the software architecture of a peer and a server according to one embodiment of the invention.

Turning now to FIG. 2, the architecture of software implementing access control functions in the network of FIG. 1 is illustrated. The software in each of peers 110A, 1108, 110C and 110D may be of the same form. Here, a generalized description is provided in connection with a peer 110, which may represent any of the peers.

Within peer 110, supplicant software components 210A, 210B, 210C and 210D are illustrated. Each supplicant represents a software component controlling transmission and receipt of information in a specific format over a specific physical link. For example, one supplicant may represent the software commonly referred to as a network adaptor to implement general communications in TCP/IP format through a specific network card. Another supplicant may represent a network adaptor to implement a VPN using the same network card. Alternatively, one or more of the supplicants may represent software controlling transmission or receipt of information over a different hardware device, such as a wireless network card or a USB port. The number and types of supplicants in peer 110 will depend on the configuration of the peer and the applications 270 the peer executes.

Each of the supplicants 210A, 210B, 210C and 210D interacts with access control software through interface 216. Herein access control software is represented by EAP host 230A. In this example, access control information is communicated according to the EAP, but the precise format in which access control information is communicated is not a limitation on the invention. Each of the supplicants 210A, 210B, 210C and 210D may be generally in a form as known in the art. However, in the illustrated embodiment each of the supplicants 210A, 210B, 210C and 210D differs from known supplicants in that the supplicants need not incorporate software components to implement access control functions. Rather, each supplicant implements any necessary access control function by placing calls on EAP host 230A through interface 216.

When a peer must transmit a datagram containing an access control message, EAP host 230A provides supplicants 210A . . . 210D with the message to be included in the datagram in order to comply with the EAP as part of the access control process. The supplicant may transmit this information in a manner similar to that used to transmit datagrams based on messages from an application 270. The supplicant implements a specific protocol that is not IP-based from the perspective of EAP. For example, EAP messages may be encapsulated in PPP frames. The PPP frames are not routable but instead are sent from one end of the link to the other end. The same is true with 802.1X frames. Nonetheless, it is possible to emulate a link layer protocol over an IP-based protocol (for example, VPN).

Datagrams received by a supplicant that contain messages in the EAP format are processed in reverse. Each of the supplicants routes messages in the EAP format to EAP host 230 through interface 216.

EAP host 230A contains software that manages the interactions necessary to obtain access to a network for peer 110. However, EAP host 230A is not limited to providing authentication functions. EAP host 230A may generate or process messages connected with any access control function, such as validating the software or hardware configuration of a peer to determine that peer 110 would not harm the network 130 if allowed access to it.

In the illustrated embodiment, access control functions performed by EAP host 230A are implemented as separate software components that are accessed through a standardized interface 218. Here, such components are illustrated by methods 250A, 250B, and 250C. Each of the methods 250A, 250B, and 250C may contain software that executes the steps needed for peer 110 to gain access to a specific network according to a specific authentication exchange. Such an exchange may begin with a request for access communicated over a network initiated by a supplicant. Such a request may trigger a server moderating access to the network to send a request for identifying information to peer 110. Such a request for identifying information received by supplicant 210A would be routed back to method 250A using interfaces 216 and 218. Method 250A would then obtain the required information and provide it to a supplicant 210A for transmission back over the network to the server. Method 250A may gather the information in a manner consistent with the specific authentication exchange being used. For example, method 250A may read information from a biosensor 112 or a smart card reader 114, if the authentication exchange requires that such information be provided by peer 110.

A comparable process is performed in server 120. Access point 140 routes messages received in the EAP format to authenticator 220. Authenticator 220 is a software component that imposes a network access policy and indicates whether any specific peer should be given access to network 130.

Authenticator 220 differs from authentication software as known in the art in that authenticator 220 need not generate or process messages in EAP format. Rather, messages received by authenticator 220 in EAP format may be passed through interface 226 to authentication control software. In this embodiment, authentication control software is shown to be implemented as EAP host 230B. EAP host 230B may be software that is conceptually similar to EAP host 230A. EAP host 230B may generate and process the desired content of messages in the EAP format for authenticator 220. In some embodiments, EAP host software is implemented to be generic for either a peer or access control server. In such embodiments, EAP host 230A and EAP host 230B may be identical copies of the same software.

As in the case of EAP host 230A, EAP host 230B accesses software components that perform access control functions through interface 228. These components are here depicted as EAP methods 250D, 250E, 250F, and 250G. The EAP methods 250D, 250E, 250F, and 250G installed on server 120 may be implemented to perform access control functions necessary to respond to a request for access from a peer and may, therefore, perform the mirror images of the functions implemented by methods 250A, 250B, and 250C. For example, as a method on a peer 110 sends a request for access, a method in server 120 may be called to generate the appropriate response to such a request.

The number of methods associated with server 120 is not a limitation on the invention. In the described embodiment, one method is provided for each access mechanism to which server 120 may respond. For example, a separate method may be provided to allow access based on authentication provided via password, via a smart card, via a biometric sensor, via a certificate, and via any other manner. However, one method may perform access control functions used in more than one authentication approach or multiple methods may be used in the implementation of a single authentication approach.

As each of the methods 250D, 250E, 250F, and 250G is called, it may generate information that is to be transmitted back to a peer requesting access. Such information is passed back to access point 140 where it is transmitted over the physical medium to the peer 110 requesting access. In this way, a virtual connection, illustrated as virtual connection 280, is established between a method such as 250A . . . 250C in peer 110 and a method such 250D . . . 250G in server 120. These methods may interact to exchange information necessary to determine whether peer 110 should be given access to network 130 and to establish such a connection if access is warranted.

Figure 3:
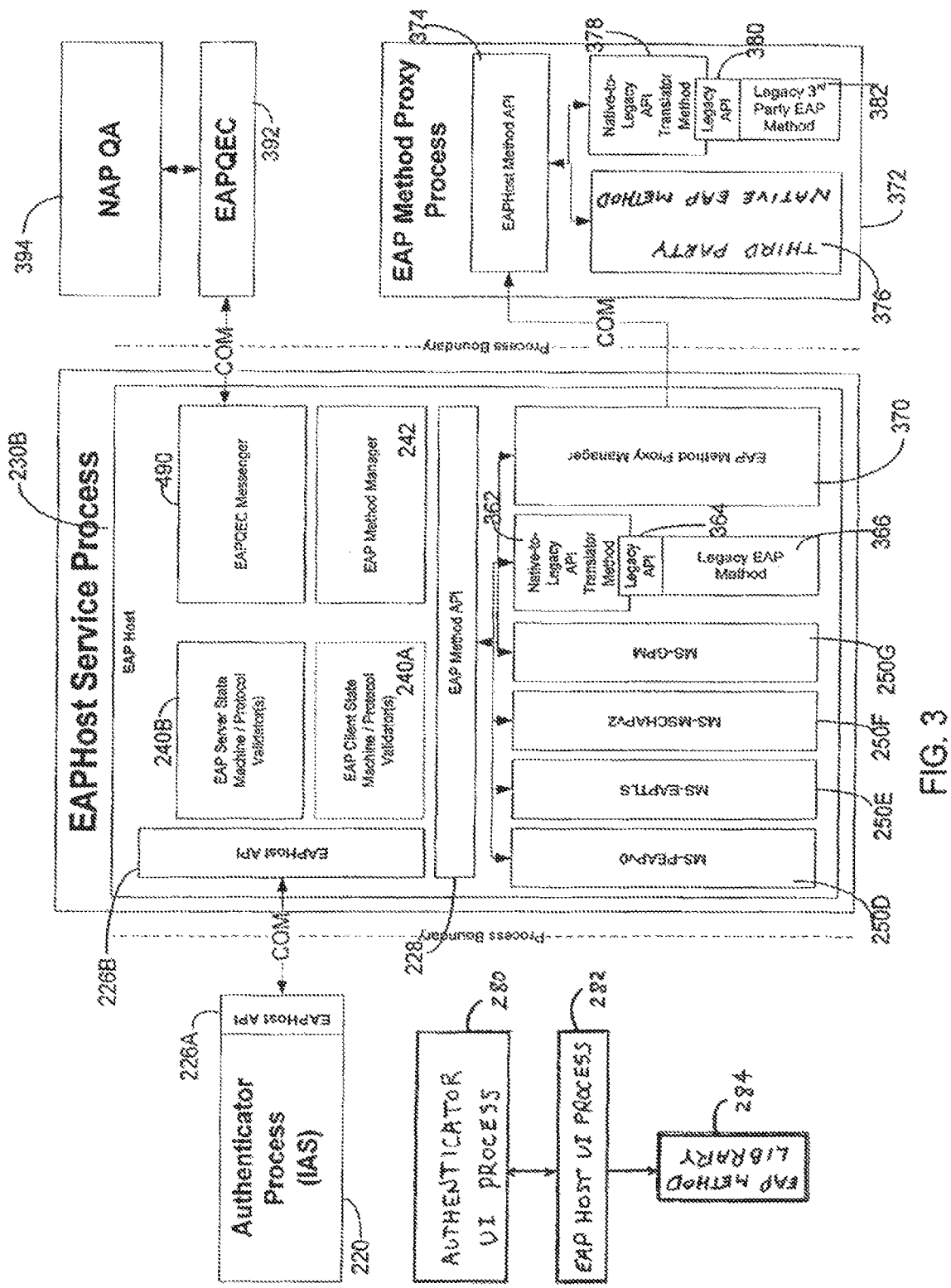
FIG. 3 is a block diagram indicating in more detail the architecture of an EAP host of FIG. 2 configured for use on a server.

Turning now to FIG. 3, additional details of the software architecture of server 120 are shown. Authenticator 220 may be software generally as known in the art for authenticating peers requesting access to a network. For example, authenticator 220 may be software performing the functions of an IAS or RADIUS server as is known in the art. However, authenticator 220, unlike authentication software known in the art, includes interface 226A. Interface 226A allows authenticator 220 to communicate with EAP host 230B. In the illustrated embodiment where authentication is performed according to the EAP, authenticator 220 calls interface 226A each time it receives a message in the EAP format with information contained in the message being passed through the interface as part of the call.

EAP host 230B includes a corresponding interface 226B. Interface 226B exchanges information with interface 226A. In the illustrated embodiment, EAP host 230B executes in its own process. Accordingly, exchange of information between interface 226A and 226B crosses a process boundary and is in a format suitable for cross-process communications. Here communications between interface 226A and 226B are in a standard protocol such as the COM protocol, but any suitable protocol for cross-process calls may be used.

EAP host 230B includes one or more software components that perform the functions needed to process or generate the content of messages exchanged with a peer as part of an access control exchange. EAP host 230B receives these messages through interface 226B. Those messages are passed to the appropriate components within EAP host 230B. Because the components within EAP host 230B do not directly interface with components external to EAP host 230B, the specific implementation of the software components within EAP host 230B is independent of other components of the network. Accordingly, any suitable implementation of the software components within EAP host 230B may be employed.

One of the components in EAP host 230B is server state machine and protocol validator 240B. In the described embodiment, information used to determine whether a peer should be granted access to the network is exchanged in the EAP. That protocol specifies both the format of the information that is transmitted and the sequence of interactions in an authorization control exchange between a peer and an access control server. State machine and protocol validator 240B tracks the interactions with each peer requesting access to the network such that the state relative to the prescribed sequence of interactions may be determined. The state machine and protocol validator 240B also determines that each message received as part of the exchange of information for access control is a valid message as specified by the EAP based on the state of the exchange. If EAP host 230B receives a message that is invalid, state machine and protocol validator 240B may identify that an error has occurred and take a desired response. A desired response may include, for example, denying access to the peer requesting access or otherwise performing error handling routines.

EAP host 230B may also include a client state machine and protocol validator 240A. As described above, EAP host 230B may be software configured for use on a server such as server 120. In some embodiments, the same software will be used for implementation of EAP host 230A, intended for use on a peer such as peer 110, and EAP host 230B, intended for use on a server. In such an embodiment, EAP host 230B also includes any necessary software to implement the peer side of the exchange. Accordingly, EAP host 230B is shown with an optional client state machine and protocol validator 240A that tracks the state of the sequence of interactions for access control and validates that messages received by the EAP host are valid messages for a peer to receive according to the EAP. In this context, the term "client" is synonymous with the term "peer."

EAP host 230B also includes a method manager 242. Method manager 242 is a software component that both controls the loading of methods from a library of methods into the process in which EAP host 230B executes and calls the appropriate methods in response to messages in the EAP format. Method manager 242 uses information contained within the messages received by host 230B to identify the appropriate method to process the message.

As described above, the EAP allows for flexibility in specifying the sequence of exchanges and the specific information exchanged between a peer requesting access and a server authenticating access. In the illustrated embodiment, a separate method is provided for each unique type of access control interaction. Method manager 242 receives messages through interface 226 and determines the appropriate method to process the message. Method manager 242 calls the appropriate method through interface 228.

Interface 228 is internal to EAP host 230B. Accordingly, the specific form of interface 228 is not critical. However, in the described embodiment, interface 228 is a published interface, allowing any interested party to generate methods that may be called by EAP host 230B for authentication of a peer according to a process defined by that method.

Maintaining the state of software processing messages according to the EAP and validating the format of messages received are functions known in the art. Such functions are performed by many supplicants that implement the EAP. Accordingly, state machine and protocol validator 240B may be implemented using programming techniques as is known in the art. Similarly, loading of library methods and routing of messages as performed by method manager 242 are known functions and method manager 242 may be coded using known coding practices. However, any suitable method of implementation of state machine and protocol validator 240B and method manager 242 may be employed.

EAP host 230B may execute multiple types of methods. In this example, EAP host 230B executes methods such as methods 250D, 250E, 250F and 250G that are loaded by method manager 242 from a method library that is part of the EAP host software. Such methods are shown to execute within the same process as EAP host 230B. Such execution may be desirable only for methods that have been thoroughly tested or are otherwise known to be reliable, such as because they are supplied by a reliable source. In one embodiment, only methods supplied in connection with the operating system for the platform on which EAP host 230B executes are executed within the same process as EAP host 230B.

The flexible architecture of EAP host 230B also allows methods such as may have existed in prior operating systems to be executed from within EAP host 230B. Such methods, termed "legacy methods," may represent methods for processing EAP messages used in prior versions of the operating system. By incorporating such methods into EAP host 230B, the cost of developing new software may be reduced. Each of the legacy methods, such as legacy method 366, includes a legacy interface 364. Legacy interface 364 is not in a format that allows it to be called through interface 228. Accordingly, translator 362 is used. Translator 362 is software containing an interface that allows the translator 362 to be called through interface 228. Translator 362 then calls legacy method 366 through interface 364. For each legacy method to be employed, a separate translator 362 may be required.

EAP host 230B is partitioned such that methods operating within the process in which EAP host 230B executes are "reliable." Unreliable methods could compromise the security provided by EAP host 230B or disrupt the operation of the system. Nonetheless, it may be desirable to allow third party authentication methods to be incorporated into the authentication process. To allow third party methods or other methods for which the reliability is not ascertained to be executed as part of the authentication process, EAP host 230B includes a method proxy manager 370. Method proxy manager 370 includes an interface in a format that can be called through interface 228. However, rather than executing an access control method directly, method proxy manager 370 places calls to third party methods operating in a separate process. In the illustrated embodiment, third party methods execute from within method proxy process 372.

Method proxy manager 370 communicates with methods within method proxy process 372 over a standardized inter-process interface. In the embodiment depicted, a COM interface is employed.

Within method proxy process 372, interface 374 executes in response to a call from method proxy manager 370. Because method proxy manager 370 and interface 374 are internal to the EAP host, any suitable implementation may be employed for exchange of information between method proxy manager 370 and interface 374 may be employed.

Upon receipt of messages from method proxy manager 370, interface 374 calls the appropriate third party methods. In the pictured embodiment, third party method 376 is shown. Third party method 376, in this embodiment, includes an interface that may have the same form as the interfaces for methods such as 250D, 250E, 250F and 250G executed within the same process as EAP host 230B.

Legacy third party methods also may be executed within method proxy process 372. For example, third party legacy method 382 is shown to have an interface 380 that is not in the format that may be called directly from interface 374. To allow legacy third party method 382 to be called, translator 378 may be used. Translator 378 may be in the same form as translator 362, but executing in a different process.

In this way, messages received by EAP host 230B representing communications from a peer requesting access to a network may be routed to the appropriate software for processing. As the software processes messages, it may generate messages to be communicated back to the peer requesting access to the network. Accordingly, each of the interfaces described above may be a two-way interface. For example, if method 376 requires information to be communicated to a peer as part of its authentication process, the information may be communicated through interface 374 to method proxy manager 370. From method proxy manager 370, the information may be communicated back through interface 228 to interface 226B. That information may then be transferred through interface 226A to authenticator 220. Authenticator 220 may transmit that information to the peer.

Additionally, the interfaces may also transmit control and status information back to authenticator 220. Each method may, in accordance with the EAP, generate information indicating whether a peer has successfully completed the authentication process. Interfaces such as 374, 228, 226A and 226B allow this status information to be transferred to authenticator 220. Authenticator 220 may process this information in the same way that information in the EAP is currently processed to arrive at an access control decision.

Figure 4:
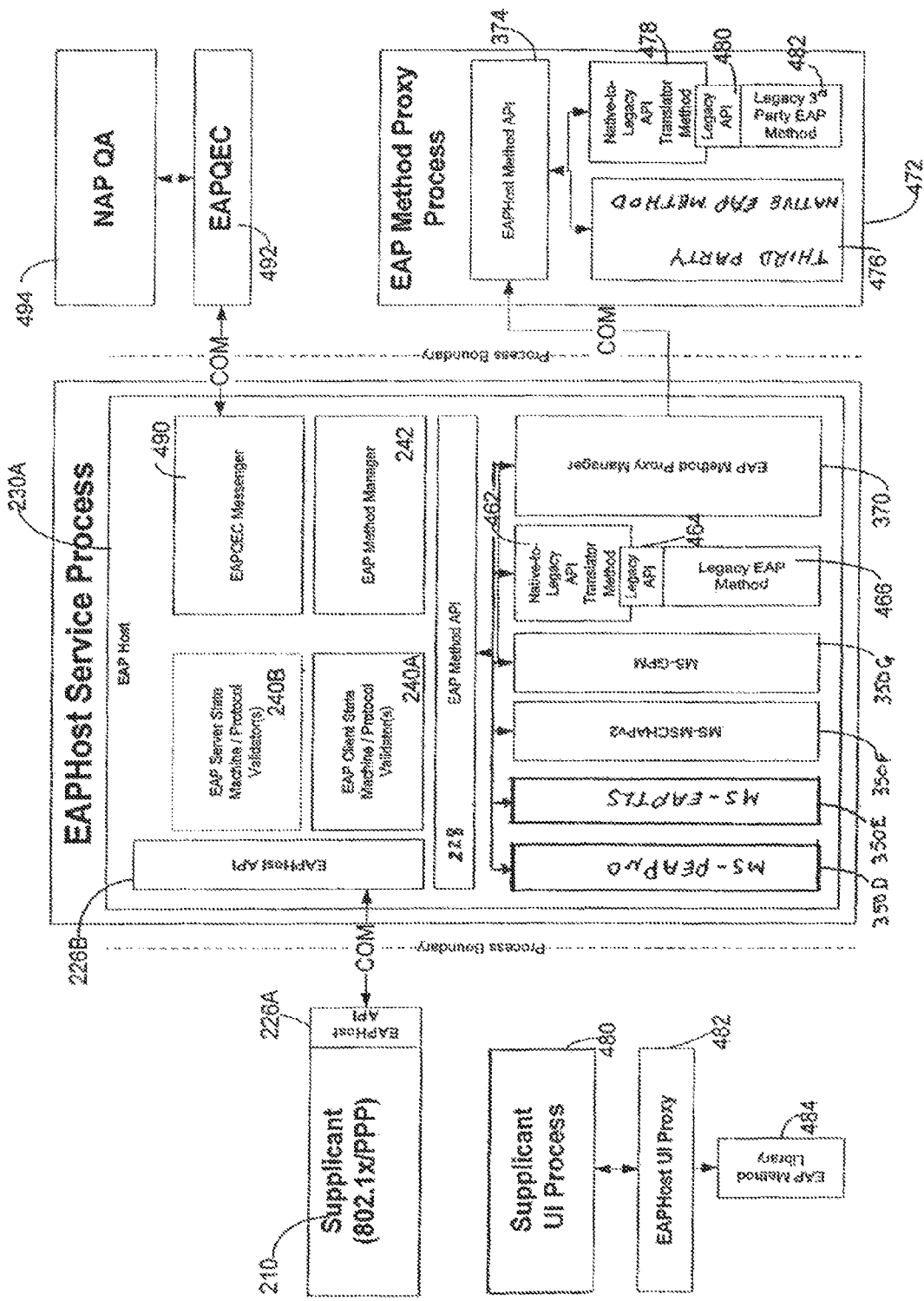
FIG. 4 is a block diagram showing in more detail the architecture of an EAP host of FIG. 2 configured for use in a peer.

FIG. 4 shows in greater detail the architecture of EAP host 230A such as may be installed on a peer. EAP host 230A may include components that are in the same form as comparable components in EAP 230B. Accordingly, FIG. 4 shows EAP host 230A including interface 226B, method manager 242, interface 228, method proxy manager 370, and interface 374. Additionally, EAP host 230A includes a client state machine and protocol validator 240A. As described above, state machine and protocol validator 240A tracks the state of the sequence of exchanges between a peer requesting access and a server determining whether such access is to be granted. State machine and protocol validator 240A also verifies that each message provided to EAP host 230A is in the appropriate protocol. EAP host 230A may optionally include server state machine and protocol validator 240B. While server state machine and protocol validator 240B is not required for operation of EAP host 230A installed on a peer, incorporating such a component allows the same software to be installed for use on either a peer or a server.

EAP host 230A also includes multiple methods that may be accessed through interface 228, each of which performs the functions for a particular type of authentication exchange. In the example illustrated in FIG. 4, methods 350D, 350E, 350F and 350G are shown executing within the same process as EAP host 230A. Similar to the configuration shown in FIG. 3, EAP host 230A may also execute legacy methods within the same process as EAP host 230A. Legacy method 466 includes a legacy interface 464. To allow calls to be placed on the legacy interface 464, translator 462 is included, performing comparable functions to translator 362 (FIG. 3).

EAP host 230A also includes method proxy manager 370 allowing third party and other methods deemed not reliable to be called from EAP host 230A. But, such third party methods are executed in a separate process 472. In this example, third party method 476 is shown. Similarly, a third party legacy method 482 is shown to have a legacy interface 480. Translator 478 allows a third party legacy interface 482 to be called by interface 374.

The methods called from EAP host 230A may be implemented to execute only the functions that a peer performs during the sequence of interactions needed to grant access to a peer. Alternatively, each of the methods may be programmed to execute functions performed by either the peer or server during the authentication process. In the latter case, the same methods may be loaded in the peer and the server and called by EAP host 230A or 230B, as appropriate.

In the peer environment, EAP host 230A is accessed by a supplicant 210. In this example, supplicant 210 may be software managing communications over a wireless network using 802.1X/PPP protocol. However, as illustrated in FIG. 2, multiple supplicants within a single peer may interact with EAP host 230. Each supplicant accessing EAP host 230A includes an interface 226A, allowing communications with EAP host 230A through interface 226B.

In the illustrated embodiment, supplicant 210 is software intended to operate on a peer that includes an operating system that does not allow software executing as an operating system service to directly access any user interface in the peer. Accordingly, EAP host 230A includes no user interface software. If user interaction is desired, EAP host 230A communicates with supplicant 210 through interface 226A to have the supplicant manage the user interaction.

Supplicant 210 is programmed to receive requests for user interaction and spawn a supplicant UI process 480. Within supplicant UI process 480, supplicant 210 may display information provided by EAP host 230 through a user interface and receive user input, which may then be provided back to EAP host 230A. In this way, methods, such as methods 350D, 350E, 350F or 350G, may obtain information from a user. Obtaining user information in this way allows methods executing within a service process to interact with a user and obtain information, such as a user name or password. In addition to complying with operating system requirements, having the supplicant 210 manage the user interface ensures that messages displayed on the user interface are raised in the appropriate context of the supplicant.

Supplicant UI process 480 may act simply as a conduit of information between a user and a method within EAP host 230A. Alternatively, supplicant UI process may interact with methods stored within a method library 484. For access to such methods, a cross-process interface 482 may be employed. In this way, though controlled from a supplicant process 480, software provided as part of EAP host 230A may manage the interface with a user.

Referring to FIG. 3, if any of the methods called by EAP host 230B requires access to a user interface, a similar approach may be used to gain access to the user interface on the server on which EAP host 230B is installed. In that scenario, authenticator 220 may raise an authenticator user interface process 280 that interfaces to methods within EAP host 230B through an interface 282. Authenticator UI process 280 may interact with methods stored within a method library 284.

The flexibility provided by EAP host 230A and 230B allows all functions needed to perform authentications according to the EAP to be implemented. In addition, the flexibility of EAP host 230A and 230B allows functions other than peer authentication to be readily incorporated. In the examples illustrated in FIGS. 3 and 4, EAP host 230A and 230B include components that may grant or deny access to a peer based on the "health" of the peer. In this context, "health" refers to any aspect of the peer that could influence its performance when connected to a network, influence the performance of the network as a whole, introduce viruses or other undesirable artifacts into the network or that otherwise indicates the status of the peer.

To make access decisions based on the "health" of clients, EAP hosts 230A and 230B may include an EAP QEC messenger 490. QEC messenger 490 communicates with "quarantine enforcement client" 492 executing outside of the process containing EAP host 230A. Quarantine enforcement client 494, when configured for operation on a peer, obtains information about the health of the peer. In the example of FIG. 4, a standard cross-process interface, such as a COM interface, is provided between EAP QEC messenger 490 and EAP quarantine enforcement client 492 is provided. Through this interface, EAP QEC messenger 490 may request information about the "health" of the client.

EAP quarantine enforcement client 492 may request health information from one or more quarantine agents 494. Quarantine agent 494 is one or more software programs or program components that may obtain the desired information from the client. For example, a quarantine agent may read the version level of an operating system. A separate quarantine agent may read the version level of virus protection installed on the client. Other quarantine agents may perform other functions designed to provide health information, such as determining whether security patches have been installed in the operating system or the date of the most recent of the update of data files for anti-virus software.

When an EAP host such as 230A is installed in a peer, information obtained through EAP quarantine enforcement client 492 may be passed by EAP QEC messenger 490 through interface 226B where it is transmitted by supplicant to an authenticator. The EAP QEC is not utilized for a sever unless the server itself is functioning as a client.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The invention claimed is:

1. A method performed on a server computing device, the method comprising:
receiving, by an extensible authentication protocol ("EAP") host of the server computing device via a network from any of a plurality of supplicants operating within a client computing device via an EAP host of the client computing device, a first message that is part of an access control exchange, where each of the plurality of supplicants operating within the client computing device implements access control functions by calling the EAP host of the client computing device, and where the server computing device controls access to resources of the network; and
requesting, by the EAP host of the server computing device from a quarantine enforcement client ("QEC") of the client computing device in response to the receiving, health information about the client device.

2. The method of claim 1 where the server computing device is an Internet Authentication Services ("IAS") server or a Remote Authentication Dial User Service ("RADIUS") server.

3. The method of claim 1 where the server computing device further comprises an authenticator configured for imposing network access policy and for indicating whether the client computing device should be granted access to the network.

4. The method of claim 1 where the health information indicates whether security patches have been installed.

5. The method of claim 1 where the health information corresponds to virus protection.

6. The method of claim 1 where the health information corresponds to an operating system.

7. The method of claim 1 further comprising granting or denying access to at least one of the resources of the network by the client computing device in accordance with the access control exchange and based on the health information.

8. A system comprising:
a server computing device;
an extensible authentication protocol ("EAP") host of the server computing device configured to receive, via a network from any of as plurality of supplicants operating within a client computing device via an EAP host of the client computing device, a first message that is part of an access control exchange, where each of the plurality of supplicants operating within the client computing device implements access control functions by calling the EAP host of the client computing device, and where the server computing device controls access to resources of the network; and
the EAP host configured to request, via the network from a quarantine enforcement client ("QEC") of the client computing device in response to the receiving health information about the client device.

9. The system of claim 8 where the server computing device is an Internet Authentication Services ("IAS") server or a Remote Authentication Dial User Service ("RADIUS") server.

10. The system of claim 8 where the server computing device further comprises an authenticator configured for imposing network access policy and for indicating whether the client computing device should be granted access to the network.

11. The system of claim 8 where the health information indicates whether security patches have been installed.

12. The system of claim 8 where the health information corresponds to virus protection.

13. The system of claim 8 where the health information corresponds to an operating system.

14. The system of claim 8 configured to grant or deny access to at least one of the resources of the network by the client computing device in accordance with the access control exchange and based on the health information.

15. At least one computer storage device comprising:
computer-executable instructions that, when executed by a server computing device, cause the server computing device to perform actions comprising:
receiving, by an extensible authentication protocol ("EAP") host of the server computing device via a network from any of a plurality of supplicants operating within client computing device via an EAP host of the client computing device, a first message that is part of an access control exchange, where each of the plurality of supplicants operating within the client computing device implements access control functions by calling the EAP host of the client computing device, and where the server computing device controls access to resources of the network; and
requesting, by the EAP host of the server computing device from a quarantine enforcement client ("QEC") of the client computing device in response to the receiving, health information about the client device.

16. The at least one computer storage device of claim 15 where the server computing device is an Internet Authentication Services ("IAS") server or a Remote Authentication Dial In User Service ("RADIUS") server.

17. The at least one computer storage device of claim 15 where the server computing device further comprises an authenticator configured for imposing network access policy and for indicating whether the client computing device should be granted access to the network.

18. The at least one computer storage device of claim 15 where the health information indicates whether security patches have been installed.

19. The at least one computer storage device of claim 15 where the health information corresponds to virus protection or an operating system.

20. The at least one computer storage device of claim 15, the actions further comprising granting or denying access to at least one of the resources of the network by the client computing device in accordance with the access control exchange and based on the health information.

* * * * *